US008425356B2

(12) United States Patent
Vachal

(10) Patent No.: US 8,425,356 B2
(45) Date of Patent: Apr. 23, 2013

(54) RETAINER FOR ENDLESS DRIVE MEMBER AND DRIVE SYSTEM AND METHOD INCORPORATING SAME

(75) Inventor: Tommy Joe Vachal, Lincoln, NE (US)

(73) Assignee: Exmark Manufacturing Company, Incorporated, Beatrice, NE (US)

( * ) Notice: Subject to any disclaimer, the term of this patent is extended or adjusted under 35 U.S.C. 154(b) by 633 days.

(21) Appl. No.: 12/612,340

(22) Filed: Nov. 4, 2009

(65) Prior Publication Data

US 2011/0105260 A1    May 5, 2011

(51) Int. Cl.
*B62J 13/00* (2006.01)
*F16D 1/00* (2006.01)
*F16H 57/02* (2012.01)
*F16H 7/18* (2006.01)

(52) U.S. Cl.
USPC .............................. 474/144; 474/131; 474/140

(58) Field of Classification Search ................ 474/131, 474/140, 144
See application file for complete search history.

(56) References Cited

U.S. PATENT DOCUMENTS

| | | | | | |
|---|---|---|---|---|---|
| 993,684 | A | * | 5/1911 | Vom Hopp | .................... 474/131 |
| 1,366,271 | A | * | 1/1921 | Matlock | ....................... 474/131 |
| 1,626,240 | A | * | 4/1927 | Kosken | ........................... 474/54 |
| 1,904,351 | A | * | 4/1933 | Bianchi | ......................... 474/150 |
| 2,085,904 | A | * | 7/1937 | Freese | ............................ 226/187 |
| 2,326,670 | A | * | 8/1943 | Patterson, Jr. | ................. 226/175 |
| 81,285 | A | * | 8/1968 | Patton | ............................ 474/131 |
| 3,581,481 | A | * | 6/1971 | Hanson et al. | ................. 56/11.3 |
| 4,337,055 | A | * | 6/1982 | Mackay et al. | ............... 474/111 |
| 4,969,859 | A | | 11/1990 | Holbrook | |
| 5,254,046 | A | | 10/1993 | Hohnl | |
| 5,816,034 | A | * | 10/1998 | Peter | .............................. 56/11.4 |

OTHER PUBLICATIONS

How to do belt guides, [online], author unknown, [retrieved on Jul. 1, 2009], Retrieved from the Internet: <URL: http://i140.photobucket.com/albums/r24/kmowtion/beltguides.jpg>. 1 page.
Lazer Z XS Air-Cooled Models Operator's Manual (Part No. 109-4129 Rev. A). Exmark Mfg. Co. Inc., (cover page, Table of Contents, pp. 30-37, and back cover of manual only); 2006.
Navigator Operator's Manual (Part No. 109-4295 Rev. A). Exmark Mfg. Co. Inc., (cover page, Table of Contents, pp. 29-37, and back cover of manual only); 2006.
Metro Operator's Manual (Part No. 109-6450 Rev. A). Exmark Mfg. Co. Inc., (cover page, Table of Contents, pp. 25-31, and back cover of manual only); 2007.

* cited by examiner

*Primary Examiner* — Michael Mansen
*Assistant Examiner* — Henry Liu
(74) *Attorney, Agent, or Firm* — Mueting, Raasch & Gebhardt, P.A.

(57) ABSTRACT

A retainer for keeping an endless drive member of a drive system in a desired position. In one embodiment, the endless drive member is configured as a belt, wherein the retainer keeps the belt in position for engagement with an associated sheave even when the belt is slackened. The retainer may be configured as an elongate member having a first end fixed to a structure and a second unsupported end opposite the first end. The retainer may be positioned near the sheave and may be elastically deflected to permit removal of the belt when desired. In one embodiment, the retainer is configured as a coiled compression spring.

14 Claims, 5 Drawing Sheets

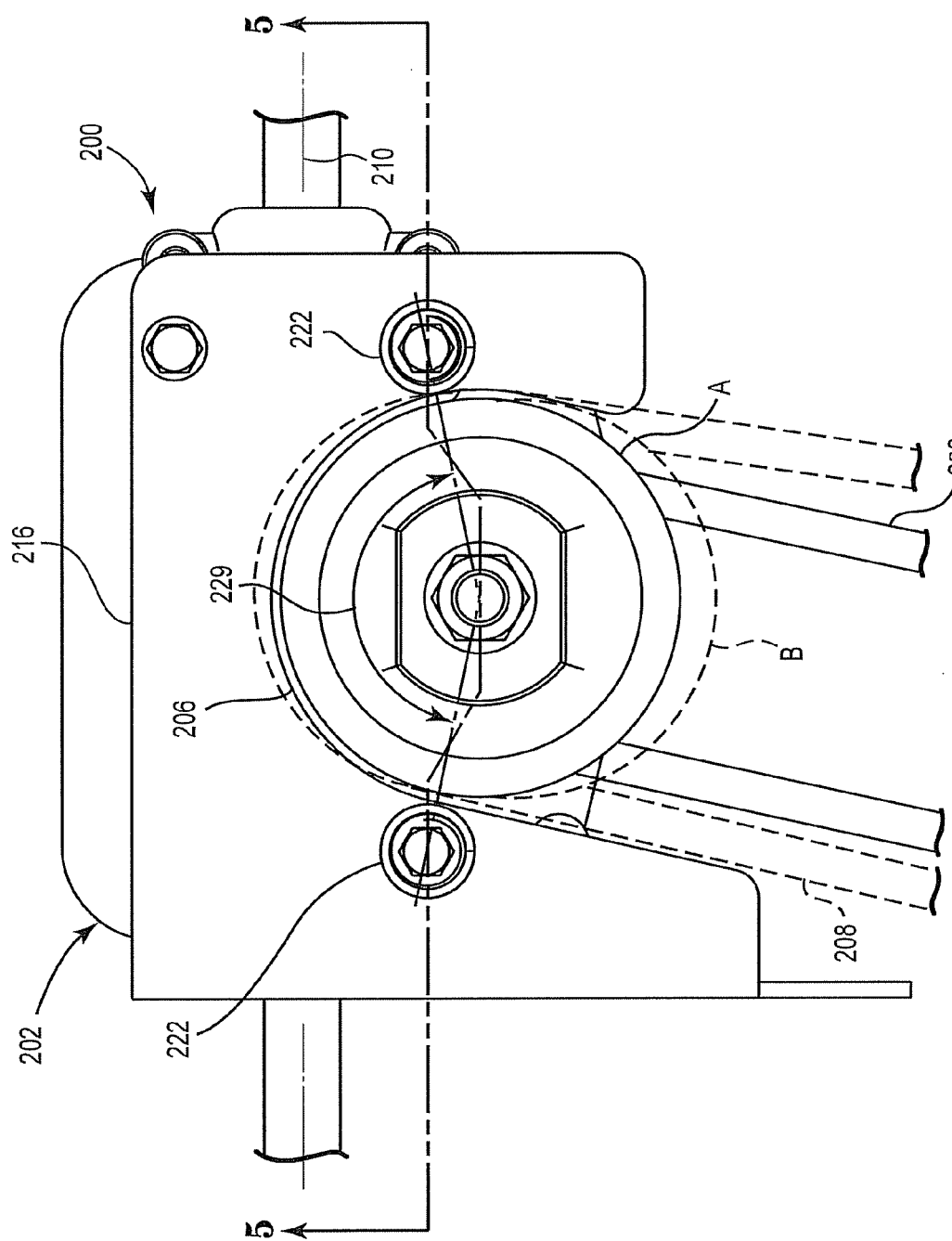

RETAINER FOR ENDLESS DRIVE MEMBER AND DRIVE SYSTEM AND METHOD INCORPORATING SAME

TECHNICAL FIELD

The present invention relates generally to power transmission systems utilizing an endless drive member such as a belt, and, more particularly, to retainers for maintaining a slackened drive member in the desired position.

BACKGROUND

Belt drive systems are commonly employed to transmit rotational power between two or more shafts. Typically, each shaft includes a sheave defining a circumferential groove in which the belt may ride. Depending on the application, the belt may be selectively tightened about the sheaves to transmit power, or slackened to reduce frictional engagement with the sheaves, e.g., to stop power transmission. Loosening of the belt may be accomplished via any number of ways including moving the shafts relatively to each other or by using a tensioning idler or a clutch.

When the belt is in its slackened position, it is important to ensure that, although loose, it does not separate completely from the sheave groove. Otherwise, re-engagement of the system (re-tensioning of the belt) may be problematic as the belt may not draw into the sheave groove and re-engage as desired.

To ensure proper belt positioning when the belt is slack, various retaining devices are known. Often these devices are constructed as wire form brackets that bolt to structure and have surfaces that sit in close proximity to the sheave just beyond the sheave periphery. These devices may be positioned to interfere with the slackened belt and ideally prevent the belt's complete exit from the sheave groove when slackened. Other belt retainers may utilize multiple rigid members that function similarly and may be attached along the periphery of the sheave.

While effective, these retainers often include numerous pieces and may require repositioning/removal, with the assistance of tools, to penult belt removal/replacement. Moreover, some of these retainer configurations may require periodic adjustment to ensure desired performance.

SUMMARY

The present invention may overcome these and other issues by providing a drive system having a sheave rotatably mounted to a structure, wherein the sheave defines a recessed circumferential groove. An endless drive member configured to encircle a portion of the sheave and lie within the groove is also provided. The system also includes a retainer having a first end attached to the structure and extending away from the structure to terminate at an unsupported second end. The retainer elastically deflects between: a first position, wherein a retaining surface of the retainer is adjacent the sheave and configured to confine the drive member to a location at least partially within the groove; and a second position, wherein the second end of the retainer is deflected sufficiently away from the sheave to permit removal of the drive member from the groove.

In another embodiment, a drive system for a power equipment unit is provided. The system includes a sheave connected to a shaft; and an endless belt configured to engage a circumferential groove formed in the sheave. The belt is configurable in a tensioned configuration where it frictionally engages surfaces defined by the groove, and a slackened configuration where it relaxes about the groove. An elongate belt retainer having a first end fixed to structure and an unsupported second end is also provided. The belt retainer defines a longitudinal axis extending between the first and second ends, wherein the belt retainer elastically deflects between: a first position, wherein a retaining surface of the retainer is adjacent the groove to retain the belt at least partially within the groove; and a second position, wherein the second end of the retainer is deflected away from the sheave sufficiently to permit the belt to exit the groove. The longitudinal axis of the retainer is parallel to an axis of rotation of the shaft when the retainer is in the first position.

In yet another embodiment, a method for installing a drive belt to a sheave of a power equipment unit is provided. The method includes: placing the belt about the sheave in close proximity to a circumferential groove formed in the sheave; and deflecting a belt retainer positioned proximate the sheave from an undeflected position to a deflected position, wherein the belt retainer includes a first end fixed to structure and an unsupported second end. The belt retainer also defines a longitudinal axis extending between the first and second ends, the longitudinal axis parallel, when the belt retainer is in the undeflected position, to an axis of rotation of the sheave. The method further includes: inserting, while the belt retainer is in the deflected position, the belt between the belt retainer and the sheave until the belt rests within the circumferential groove; and releasing the belt retainer from the deflected position, wherein it returns to the undeflected position.

The above summary is not intended to describe each embodiment or every implementation of the present invention. Rather, a more complete understanding of the invention will become apparent and appreciated by reference to the following Detailed Description of Exemplary Embodiments and claims in view of the accompanying figures of the drawing.

BRIEF DESCRIPTION OF THE VIEWS OF THE DRAWING

The present invention will be further described with reference to the figures of the drawing, wherein:

FIG. 4 is a top plan view of the transmission of FIG. 3 when assembled showing two retainers used to maintain a slackened belt in a desired position about a sheave of the transmission, the system shown with the belt in a tensioned configuration and the transmission in a corresponding drive position A (solid lines), and with the belt in a slackened configuration and the transmission in a corresponding stop position B (broken lines); and FIGS. 5A-5B are section views taken generally along line 5-5 of FIG. 4, wherein: FIG. 5A illustrates the system, e.g., transmission, in the drive position with the belt in the tensioned configuration (solid line representation), and with the belt in the slackened configuration (broken line representation) as may occur when the transmission is moved to the stop position; and FIG. 5B illustrates the system of FIG. 5A, with the transmission in the stop position and the belt in the slackened configuration, with the retainer deflected for belt removal/installation.

Figure 1:
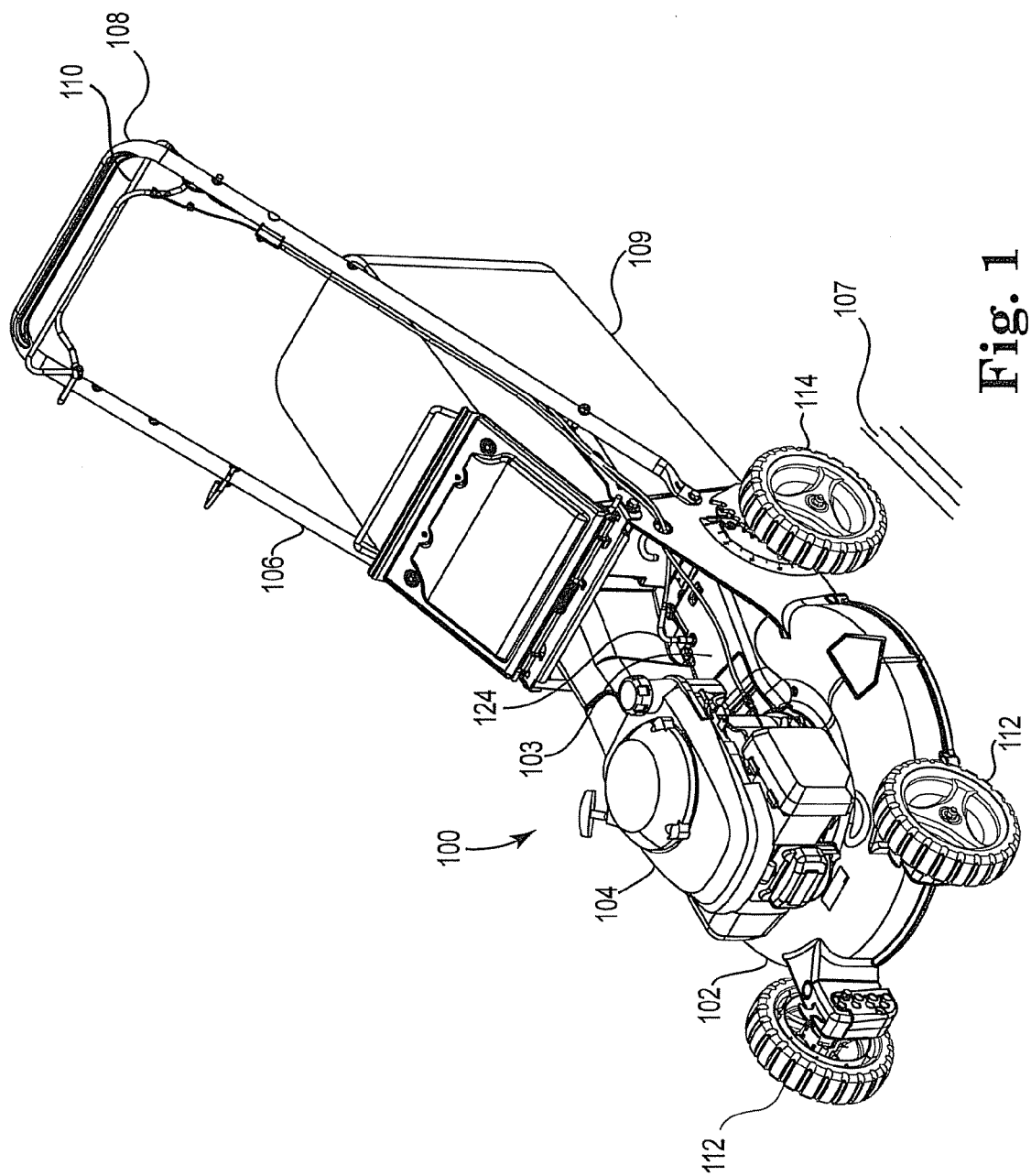
FIG. 1 illustrates a perspective view of a power equipment unit, e.g., walk-behind lawn mower, that may incorporate an endless drive member retainer and drive system in accordance with embodiments of the present invention.

The figures are rendered primarily for clarity and, as a result, are not necessarily drawn to scale.

DETAILED DESCRIPTION OF EXEMPLARY EMBODIMENTS

In the following detailed description of illustrative embodiments of the invention, reference is made to the accompanying figures of the drawing which form a part hereof, and in which are shown, by way of illustration, specific embodiments in which the invention may be practiced. It is to be understood that other embodiments may be utilized and structural changes may be made without departing from the scope of the present invention.

Generally speaking, embodiments of the instant invention are directed to power equipment units, and, more specifically, to drive member retainers and corresponding drive systems. Exemplary retainers may be used to maintain the position of an endless drive member, such as a belt, relative to a driven member. For example, apparatus and methods in accordance with embodiments of the present invention may be used to retain a belt within a circumferential groove of a sheave or pulley, even when tension in the belt is relaxed.

Embodiments of the present invention are described herein in the context of a wheel drive system for a rotary, walk-behind lawn mower 100 as shown in FIG. 1. However, those of skill in the art will appreciate that other embodiments of the present invention could find application to most any other belt-driven system without departing from the scope of the invention. Moreover, while illustrated and described herein as a belt drive system, embodiments of the instant invention may find application to other power transmission systems utilizing other types of endless drive members now known or later developed.

FIG. 1 illustrates a walk-behind power equipment unit, e.g., a rotary lawn mower 100, in accordance with one embodiment of the present invention. As shown in this view, the mower 100 may include a deck or housing 102 and a prime mover (e.g., internal combustion engine 104 or electric motor) attached to the housing. A handle assembly 106 may also be included. The handle assembly 106 may extend upwardly and rearwardly from the housing 102 as shown. The handle assembly 106 may, in one embodiment, be generally U-shaped to form a hand grip portion 108 operable to receive hands of an operator during operation of the mower 100. The handle assembly 106 may further include various operator controls such as a drive control bail 110 and an operator presence control bail.

The power equipment unit, e.g., mower 100, may further include two or more ground engaging front wheel assemblies 112 (one positioned near each front corner of the housing 102) and rear wheel assemblies 114 (only one rear wheel assembly visible in FIG. 1) to allow rolling engagement of the housing 102 over a ground surface 107. The housing 102 may define a downwardly facing cutting chamber in which a rotatable cutting blade (not shown) is located. When the mower 100 passes over the ground surface 107, the cutting blade may sever grass or other vegetation at a pre-determined height as is known in the art. The engine 104 may provide the necessary rotational power to the cutting blade and may optionally provide driving power to one or more of the wheels (e.g., to both rear wheels assemblies 114) via a transmission 202 (see, e.g., FIGS. 2 and 3). A removable bag 109 may be provided to permit the collection of grass clippings when the mower is configured in a bagging mode.

In the illustrated embodiment, both rear wheel assemblies 114 may be raised and lowered (relative to the housing 102) via a single adjustment lever to effectively raise or lower the rear of the housing 102. In the illustrated embodiment, however, the front wheel assemblies 112 may be independently raised and lowered. An exemplary mechanism for raising and lower the front wheel assemblies is described in U.S. patent application Ser No. 12/571,790 filed Oct. 1, 2009, which is incorporated herein by reference in its entirety.

Relative terms such as "left," "right," "fore," "forward," "aft," "rearward," "top," "bottom," "upper," "lower," "horizontal," "vertical," and the like are, if used herein, from the perspective of one operating the mower 100 while the mower is in an operating configuration, e.g., while the mower 100 is positioned such that the wheels 112, 114 rest upon the generally horizontal ground surface 107 as shown in FIG. 1. These terms are used herein only to simplify the description, however, and not to limit the scope of the invention in any way.

Figure 2:
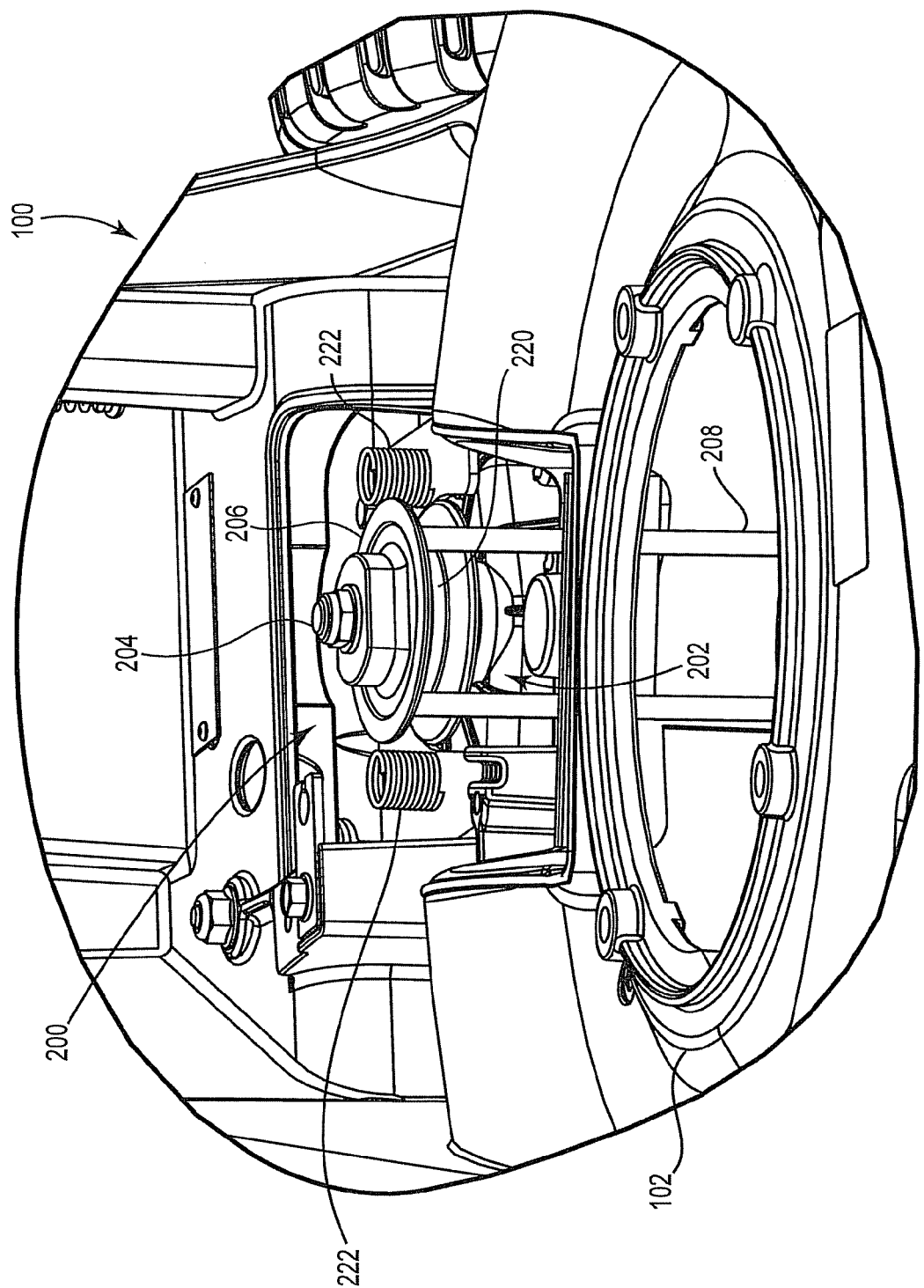
FIG. 2 is an alternative perspective view of the unit of FIG. 1 with some structure removed to better illustrate the exemplary drive system and retainer.
Figure 3:
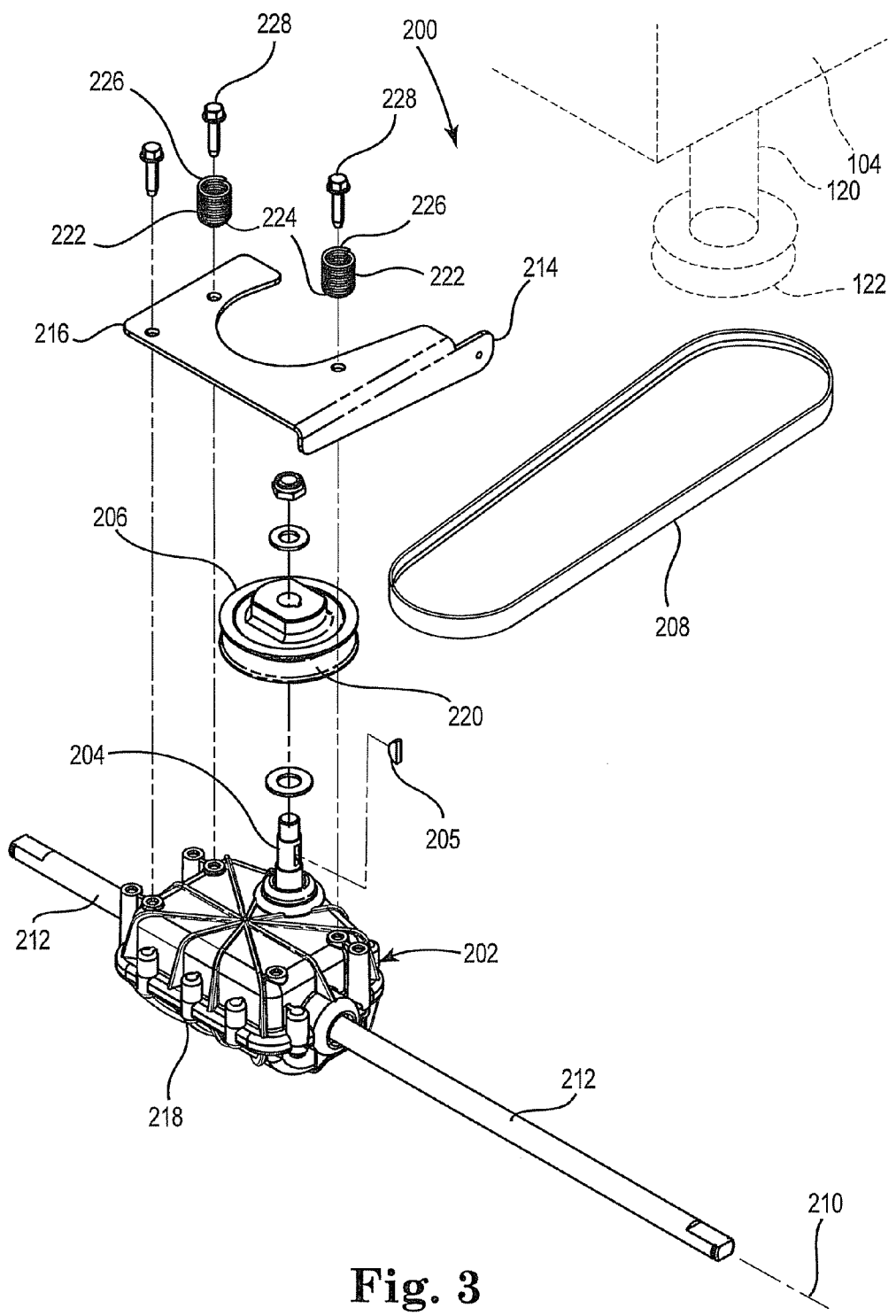
FIG. 3 is an exploded view illustrating the drive system of FIG. 2 with various surrounding structure removed for clarity, the exemplary drive system including a transmission, drive member (e.g., belt), and drive member retainers in accordance with embodiments of the invention.

The exemplary mower of FIG. 1 is shown with a belt cover 103 installed. FIG. 2 is an enlarged view of the mower with the belt cover 103 and engine 104 of FIG. 1 removed to illustrate a drive system, e.g., belt drive system 200, in accordance with one embodiment of the invention. FIG. 3 is an exploded view of the drive system 200 with various mower structure removed for clarity.

The belt drive system 200, in the illustrated embodiment, transfers power from a driveshaft 120 (see FIG. 3) of the engine 104 to the transmission 202 that selectively powers one or both rear wheel assemblies 114 via an axle 212. In general, the driveshaft 120 includes a sheave 122. Another sheave 206 may be rotatably mounted to a device or structure, e.g., to the transmission 202. In the illustrated embodiment, the sheave 206 is rotationally fixed relative to an input shaft 204 connected to the transmission via a key 205/keyway (see FIG. 3) or the like. An endless drive member, e.g., belt such as V-belt 208, may encircle a portion of both the sheaves 122 and 206 such that the belt lies within a recessed circumferential groove formed in each sheave. When the belt 208 is tensioned, frictional engagement between the belt 208 and surfaces of the sheaves 122, 206 results in power transmission from the engine 104 to the transmission 202. When the belt 208 is selectively slackened, frictional engagement between the belt and the sheaves is interrupted, terminating power delivery.

In one embodiment, the belt may be slackened by movement of the shaft 204 (e.g., movement of the transmission) relative to the engine 104. For example, the transmission 202 may pivot, under operator command, about an axis 210 of the axle 212. For instance, a conventional Bowden cable 124 (see FIG. 1) may extend from the drive control bail 110 and attach to a lever arm 214 (see FIG. 3) of a bracket 216 attached to a housing 218 of the transmission. Manipulation of the drive control bail may result in tensioning of the cable (e.g., pulling up on the lever arm 214), which'causes the housing to pivot about the axis 210 and tension the belt 208.

As the belt is placed in a tensioned configuration, it tightly and frictionally engages surfaces defined by a circumferential groove 220 formed in the sheave 206 to permit power transmission. However, when the belt is loosened within the groove to a slackened configuration, e.g., to cease power delivery to the transmission, the belt 208 may, unless otherwise provided for by a retainer (of which various embodiments are shown and described herein), slip out of the groove 220. When this occurs, the belt may have difficulty re-entering the groove when the belt is subsequently re-tensioned.

To assist with belt positioning and to maintain the belt within the groove 220 when slackened, one or more retainers 222 in accordance with embodiments of the present invention may be provided. In the illustrated embodiment, two retainers 222 are provided and positioned on opposite sides of the sheave, but more or less are certainly possible without departing from the scope of the invention. While the exact configuration may vary, the construction of an exemplary retainer 222 will now be described.

Each retainer 222 may have a first end 224 attached to structure (e.g., to the bracket 216 or directly to the housing 218 of the transmission), and extend away from the structure to terminate at an unsupported second end 226. As a result, the retainer may, in one embodiment, form a cantilever structure. Each belt retainer 222 may furthermore define an elongate structure having a longitudinal axis 223 extending between the first and second ends, wherein the longitudinal axis is parallel (when the retainer is in a first or undeflected position (see FIG. 5A)) to a rotational axis 225 of the sheave 206, e.g., parallel to an axis of rotation of the shaft 204. It is noted that, although the retainer is described and illustrated as operatively attached to the transmission from which the sheave 206 extends, this is not limiting. For instance, the retainers could be attached to a separate structure positioned above the sheave without departing from the scope of the invention.

For reasons that will become apparent, retainers in accordance with embodiments of the present invention may also be elastically deflectable. For instance, each retainer may be displaced from the first position (see, e.g., FIG. 5A) to a second or deflected position (see, e.g., left retainer in FIG. 5B) by application of a load or moment applied to, for example, the second end 226, wherein the retainer returns to its undeflected, first position once the load/moment is removed. In the illustrated embodiments, each retainer 222 is formed by a coiled compression spring. The first end 224 of each compression spring may be attached to the transmission structure with, for example, a removable fastener 228.

FIG. 4 illustrates a partial top plan view of the transmission 202, sheave 206, and retainers 222 of the exemplary system 200. As illustrated in this view, each retainer 222 may be located, when in the first position, such that a retaining surface (e.g., peripheral or outer circumferential portion of the retainer) is offset but adjacent to an outer circumferential edge of the groove 220. This positioning of the retainer 222 allows the retainer to confine the belt 208 to a location that is at least partially within the sheave groove 220 as further described below. In one embodiment, the portion of the retainer closest to the sheave is radially offset from the outer edge of the sheave a distance 221 (see FIG. 5B) of about 0.06 to about 0.12 inches, e.g., about 0.08 inches. However, different embodiments may utilize other offset distances depending upon various factors, e.g., system geometry and belt size.

Figure 5A:
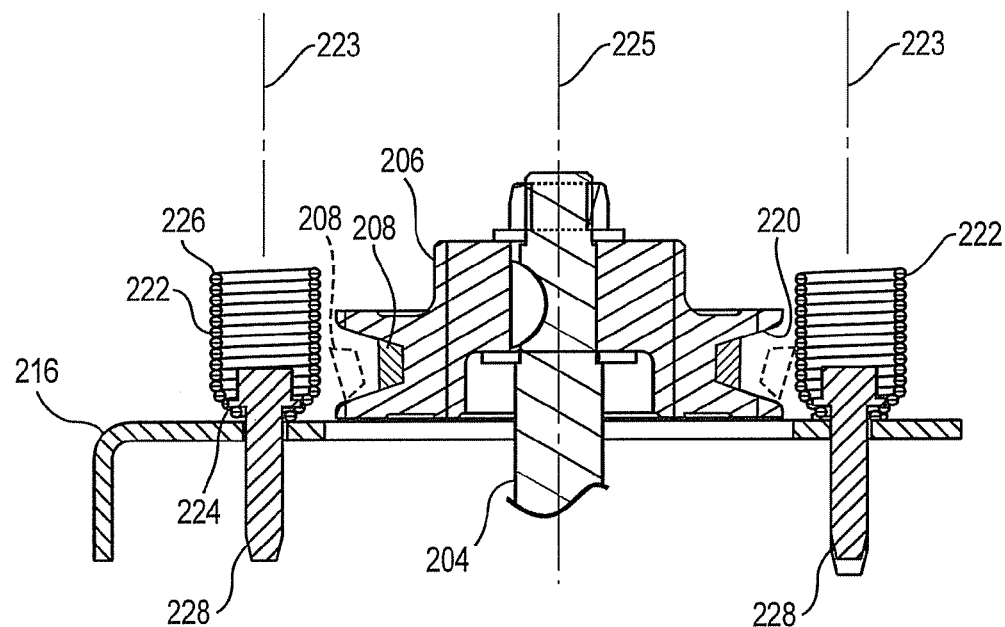

In the illustrated embodiment, each retainer 222 is configured to extend across an entire width (e.g., height) of the groove 220 as shown in FIG. 5A. Moreover, each retainer 222 may be angularly positioned about the diameter of the sheave to ensure the desired belt retention without interfering with belt operation once the belt is tensioned. The relative angular locations of the retainers 222 may be selected based upon a variety of factors including, for example, position of surrounding structure, belt lead-in angle to the sheave, etc. In the illustrated embodiment, the belt retainers 222 may be positioned about the sheave at an angular spacing 229 (see FIG. 4) of about 155 degrees.

FIG. 4 further illustrates a method for tensioning the belt 208. For instance, the housing, e.g., transmission 202, may pivot (as described above), about the axis 210, between a drive position A, corresponding to the tensioned configuration of the belt, and a stop position B, corresponding to the slackened configuration of the belt. Once again, this movement of the transmission 202/housing 218 may be accomplished by manipulation of the drive control bail 110 (see FIG. 1).

FIG. 5A illustrates a section view diagrammatically taken along line 5-5 of FIG. 4. As shown in this view, when the belt 208 is tensioned (see solid line rendering of the belt 208) about the sheave 206, the retainers 222 are sufficiently distanced from the sheave to avoid interference with sheave rotation. However, when the belt is relaxed (see broken line rendering), e.g., when the operator releases the drive control bail 110, the belt 208 may fall outwardly away from the inner surfaces of the groove 220. As the belt moves away from the sheave, it may eventually contact the retainers 222 as shown. That is, each retainer 222 may, when in the first position, be located to contact an outer edge of the belt before an inner edge of the belt moves outwardly beyond the outermost edge of the sheave. By keeping the belt positioned at least partially in the groove 220, correct re-engagement of the belt with the groove may occur when the belt is re-tensioned.

Figure 5B:
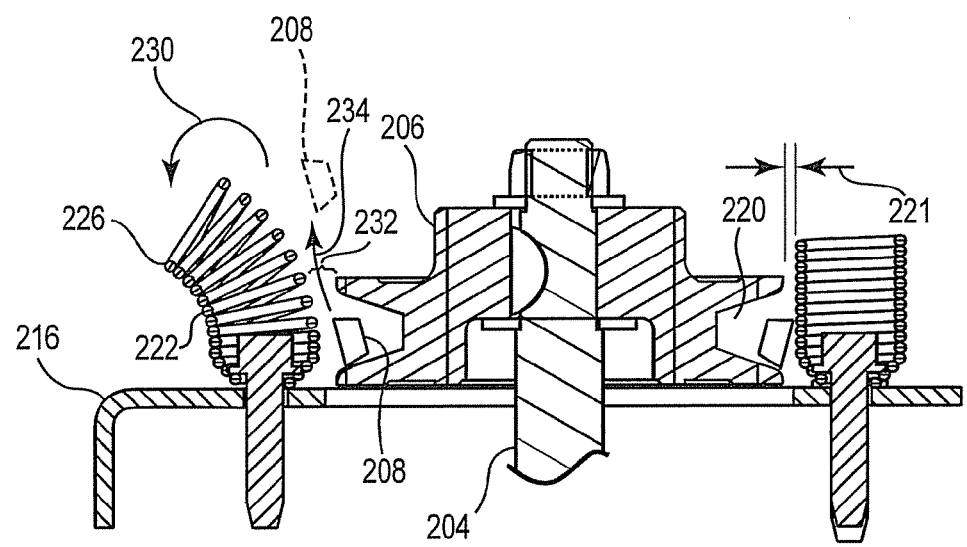

FIG. 5B illustrates removal of a slackened belt 208/installation of a new belt from the sheave in accordance with one embodiment of the invention. As shown in this view, once the drive system is deactivated (e.g., the transmission 202 is moved to position B of FIG. 4 to slacken the belt 208) and the engine 104 is shut down, each retainer 222 may be manipulated, e.g., by deflecting the second end 226 outwardly away from the sheave 206, from the first position to the second position. In the second position, the second end 226 of the retainer 222 may be deflected sufficiently away from the sheave 206 to permit the belt 208 to exit completely from the groove 220 and away from the sheave. In one embodiment, this manipulation may be accomplished by applying an external force (e.g., a moment in the direction 230) to the second end 226 of the retainer until it moves to a location sufficient to form a gap 232 adequate to permit the belt to enter/exit the groove 220 of the sheave 206.

The force necessary to displace the retainer may be applied by contact with the belt itself (e.g., pulling the belt outwardly to deflect the retainer), or by external means (e.g., inserting a finger or tool in the retainer and deflecting it before withdrawing the belt).

Once the retainer is deflected to the second position, the belt 208 may be slid upwardly and out of the groove 226 as indicated by the arrow 234 in FIG. 5B. The belt may be replaced by inserting the same or a different belt into the sheave groove while the retainer is deflected as shown with the leftmost retainer 222 in FIG. 5B. Once the belt rests within the groove, the force on the retainer may be released, upon which it may return to its initial, undeflected position as illustrated in FIG. 5A.

Accordingly, systems, retainers, and methods in accordance with embodiments of the present invention may permit belt removal and reinstallation without the need for tools to first remove the retainer. Moreover, the belt may remain desirably located within the belt groove even when the belt is slackened. As a result, failure of the belt to re-engage the groove of the sheave upon re-tensioning may be minimized.

Illustrative embodiments of this invention are discussed and reference has been made to possible variations within the scope of this invention. These and other variations, combinations, and modifications will be apparent to those skilled in the art without departing from the scope of the invention, and it should be understood that this invention is not limited to the illustrative embodiments set forth herein. Accordingly, the invention is to be limited only by the claims provided below and equivalents thereof.

What is claimed is:

1. A drive system comprising:
a sheave rotatably mounted to a structure, the sheave defining a recessed circumferential groove;
an endless drive member configured to encircle a portion of the sheave and lie within the groove; and
a retainer having a first end attached to the structure and extending away from the structure to terminate at an unsupported second end, the retainer comprising a spring, wherein the retainer elastically deflects between: a first position, wherein a retaining surface of the retainer, which is defined by an outer circumferential portion of the spring, is adjacent the sheave and configured to confine the drive member to a location at least partially within the groove; and a second position, wherein the second end of the retainer is deflected sufficiently away from the sheave to permit removal of the drive member from the groove.

2. The system of claim 1, wherein the system includes two retainers positioned on opposite sides of the sheave.

3. The system of claim 1, wherein the first end of the spring is attached to the structure with a fastener.

4. The system of claim 1, wherein the structure comprises a transmission housing of a walk-behind lawn mower.

5. The system of claim 1, wherein the endless drive member comprises a belt.

6. A drive system for a power equipment unit, the system comprising:
a sheave connected to a shaft;
an endless belt configured to engage a circumferential groove formed in the sheave, the belt configurable in a tensioned configuration where it frictionally engages surfaces defined by the groove, and a slackened configuration where it relaxes about the groove; and
an elongate belt retainer comprising a spring and having a first end fixed to structure and an unsupported second end, the belt retainer defining a longitudinal axis extending between the first and second ends, wherein the belt retainer elastically deflects between: a first position, wherein a retaining surface formed by a peripheral portion of the spring of the retainer is adjacent the groove to retain the belt at least partially within the groove; and a second position, wherein the second end of the retainer is deflected away from the sheave sufficiently to permit the belt to exit the groove, and wherein the longitudinal axis of the retainer is parallel to an axis of rotation of the shaft when the retainer is in the first position.

7. The system of claim 6, further comprising a second belt retainer.

8. The system of claim 6, wherein the retainer is configured to extend across an entire width of the groove.

9. The system of claim 6, wherein the first end of the retainer is removably fastened to the structure.

10. The system of claim 6, wherein the shaft is connected to a housing, the housing movable between a drive position corresponding to the tensioned configuration of the belt, and a stop position corresponding to the slackened configuration of the belt.

11. The system of claim 10, wherein the housing comprises the structure to which the first end of the belt retainer is fixed.

12. The system of claim 6, wherein the retainer is deflected from the first position to the second position by application of an external force applied at or near the second end of the retainer.

13. A drive system comprising:
a sheave rotatably mounted to a structure, the sheave defining a recessed circumferential groove;
an endless drive member configured to encircle a portion of the sheave and lie within the groove; and
a retainer comprising a compression spring, the retainer having a first end attached to the structure and extending away from the structure to terminate at an unsupported second end, wherein the retainer elastically deflects between: a first position, wherein a retaining surface of the retainer is adjacent the sheave and configured to confine the drive member to a location at least partially within the groove; and a second position, wherein the second end of the retainer is deflected sufficiently away from the sheave to permit removal of the drive member from the groove, wherein the retaining surface comprises an outer circumferential portion of the compression spring.

14. A drive system for a power equipment unit, the system comprising:
a sheave connected to a shaft;
an endless belt configured to engage a circumferential groove formed in the sheave, the belt configurable in a tensioned configuration where it frictionally engages surfaces defined by the groove, and a slackened configuration where it relaxes about the groove; and
an elongate belt retainer comprising a compression spring having a first end fixed to structure and an unsupported second end, the belt retainer defining a longitudinal axis extending between the first and second ends, wherein the belt retainer elastically deflects between: a first position, wherein a retaining surface of the retainer, defined by a peripheral portion of the compression spring, is adjacent the groove to retain the belt at least partially within the groove; and a second position, wherein the second end of the retainer is deflected away from the sheave sufficiently to permit the belt to exit the groove, and wherein the longitudinal axis of the retainer is parallel to an axis of rotation of the shaft when the retainer is in the first position.

* * * * *